US012663145B2

(12) United States Patent
Loomis

(10) Patent No.: US 12,663,145 B2
(45) Date of Patent: Jun. 23, 2026

(54) DECORATIVE TERMINATION DEVICE FOR DECORATIVE LIGHTING DISPLAY

(71) Applicant: Seasons 4, Inc., Toano, VA (US)

(72) Inventor: Jason Loomis, Decatur, GA (US)

(73) Assignee: Seasons 4, Inc., Toano, VA (US)

( * ) Notice: Subject to any disclaimer, the term of this patent is extended or adjusted under 35 U.S.C. 154(b) by 0 days.

(21) Appl. No.: 18/946,111

(22) Filed: Nov. 13, 2024

(65) Prior Publication Data

US 2025/0155114 A1 May 15, 2025

Related U.S. Application Data

(60) Provisional application No. 63/598,458, filed on Nov. 13, 2023.

(51) Int. Cl.
*F21V 23/06* (2006.01)
*F21S 4/10* (2016.01)
*F21V 19/00* (2006.01)
*F21Y 113/20* (2016.01)

(52) U.S. Cl.
CPC ................ *F21V 23/06* (2013.01); *F21S 4/10* (2016.01); *F21V 19/0005* (2013.01); *F21V 19/007* (2013.01); *F21Y 2113/20* (2016.08)

(58) Field of Classification Search
CPC .... F21V 23/06; F21V 19/0005; F21V 19/007; F21S 4/10; F21Y 2113/20
See application file for complete search history.

(56) References Cited

U.S. PATENT DOCUMENTS

| | | | | |
|---|---|---|---|---|
| 7,455,426 | B2 * | 11/2008 | Lai | F21V 23/04 362/391 |
| 2005/0128746 | A1 * | 6/2005 | Cheng | F21V 21/08 362/396 |
| 2005/0157497 | A1 * | 7/2005 | Hsu | F21V 21/08 362/249.06 |
| 2005/0286255 | A1 * | 12/2005 | Sugar | F21S 4/10 362/653 |
| 2019/0282016 | A1 * | 9/2019 | Long | H05B 47/16 |
| 2020/0041078 | A1 | 2/2020 | Deville | |
| 2020/0245549 | A1 * | 8/2020 | Kong | A01D 34/90 |
| 2023/0268692 | A1 * | 8/2023 | Morello | H01R 13/6277 439/489 |

FOREIGN PATENT DOCUMENTS

| | | | |
|---|---|---|---|
| WO | 2022217603 | A1 | 10/2022 |

* cited by examiner

*Primary Examiner* — Evan P Dzierzynski
(74) *Attorney, Agent, or Firm* — Kinney & Lange, P.A.

(57) ABSTRACT

Apparatus and associated methods relate to a decorative termination device for a decorative lighting display. The decorative termination device includes a locking connector configured to physically couple with and secure to terminal electrical connector of the decorative lighting display. When secured to the terminal electrical connector of the decorative lighting display, a locking mechanism prevents decoupling of the locking connector in response to a gravitational force upon the decorative termination device. The decorative termination device includes a decorative ornament connected to the locking connector. The decorative ornament has a mass greater than a mass of a single lighting element of the decorative lighting display.

22 Claims, 6 Drawing Sheets

DECORATIVE TERMINATION DEVICE FOR DECORATIVE LIGHTING DISPLAY

BACKGROUND

Decorative lighting displays can include multiple interconnected decorative lighting components, such as, for example, light strings. To facilitate such multiple interconnections, the decorative lighting elements often have at least two electrical connectors-a first electrical connector configured to draw operating power for the decorative lighting element from another decorative lighting element and a second electrical connector configured to provide operating power to another decorative lighting element connected thereto. Typically, these decorative lighting displays have one or more electrical connectors that are unused (i.e., no decorative lighting components are connected thereto). One such example of a decorative lighting display involving multiple interconnected decorative lighting components is a curtain light string.

Curtain light strings are strings of lights configured to provide a curtain of lighting over a window, a door, or otherwise hang from a support structure. These curtain lights are usually configured as a series of substantially vertical strings of lights suspended from some sort of securing structure. The desired length of these curtain light strings can vary depending on the venue to be decorated. Distances between securing structures at different venues will dictate different numbers of lights and different dimensions of strings of such lights, which are required for these different venues. Thus, every venue requires customized requirements for providing curtain-lighting displays. Moreover, it is often desired that such light string hang in a substantially plumb fashion. An adaptable system for providing customized curtain-lighting displays would facilitate installation of curtain lights in these various venues.

SUMMARY

Some embodiments relate to a decorative termination device for a decorative lighting display. The decorative termination device includes a locking connector and a decorative ornament. The locking connector is configured to physically couple with and secure to terminal electrical connector of the decorative lighting display. When secured to the terminal electrical connector of the decorative lighting display, a locking mechanism prevents decoupling of the locking connector from the terminal lighting element in response to a tensile force acting upon the decorative termination device. The decorative ornament is connected to the locking connector, the decorative ornament having a mass equal to or greater than a mass of a single lighting element of the decorative lighting display.

Some embodiments related to a method of terminating a decorative lighting display. In the method, a decorative termination device having a locking connector coupled thereto is provided. The locking connector of the decorative termination device is physically secured to a terminal electrical connector of the decorative lighting display. When secured to the terminal electrical connector of the decorative lighting display, a locking mechanism prevents decoupling of the locking connector from the terminal lighting element in response to a tensile force acting upon the decorative termination device. The tensile force to the decorative lighting display is provided via the decorative termination device.

DETAILED DESCRIPTION

Apparatus and associated methods relate to a decorative termination device for a decorative lighting display. The decorative termination device includes a locking connector configured to physically couple with and secure to a terminal electrical connector of the decorative lighting display. When secured to the terminal electrical connector of the decorative lighting display, a locking mechanism prevents decoupling of the locking connector in response to a tensile force upon the decorative termination device. The decorative termination device includes a decorative ornament connected to the locking connector. The decorative ornament has a mass equal to or greater than a mass of a single lighting element of the decorative lighting display.

Figure 1:
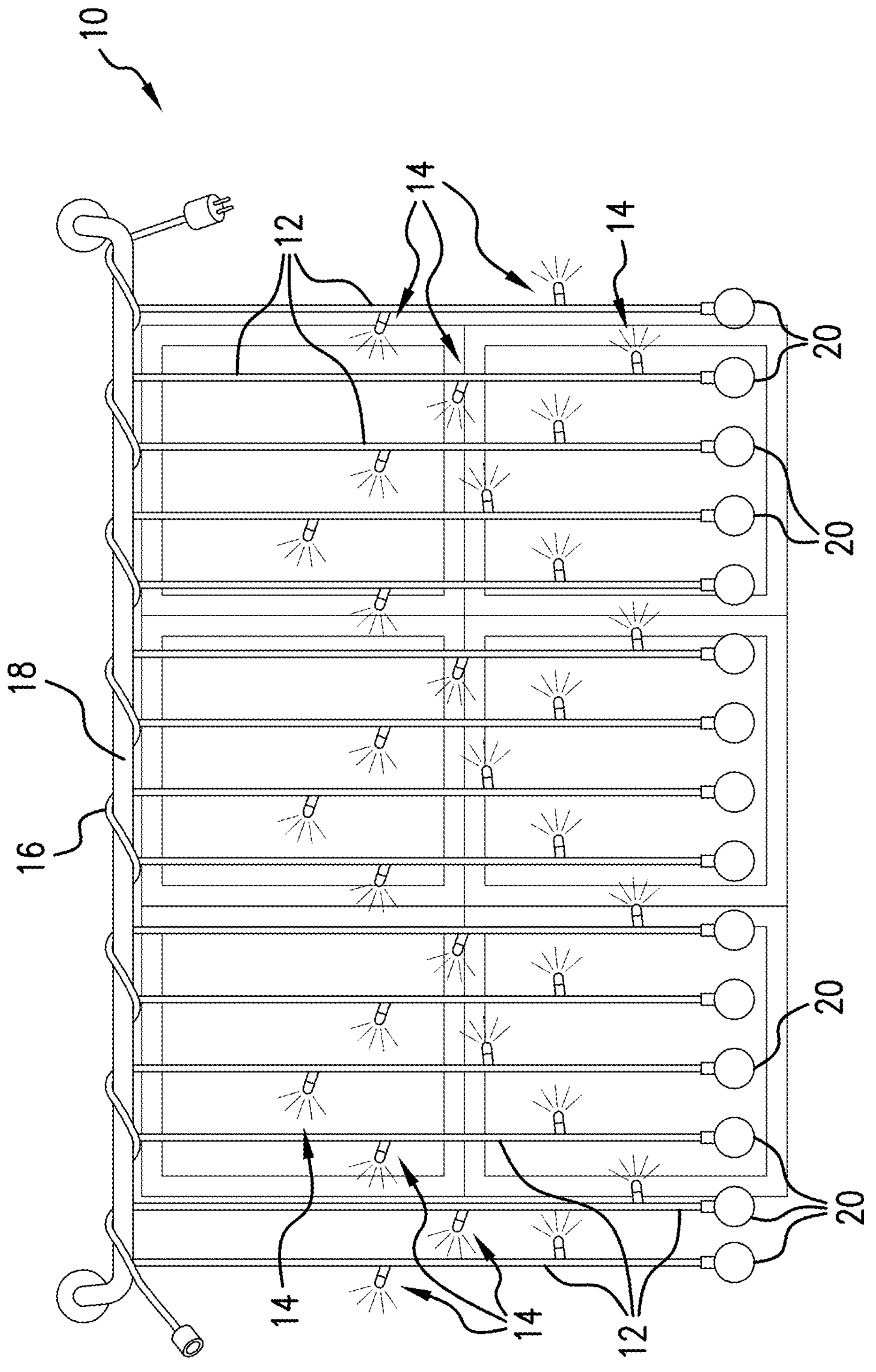
FIG. 1 is a schematic diagram of a curtain-lighting display that has a decorative termination device on each of a plurality of light strings of the curtain-lighting display.

FIG. 1 is a schematic diagram of a curtain-lighting display that has a decorative termination device on each of a plurality of light strings of the curtain-lighting display. In FIG. 1, curtain-lighting display 10 includes light strings 12, each of which includes a plurality of lighting elements 14. Light strings 12 draw operating power from backbone wire 16, which is depicted as being wrapped around curtain rod 18. Each of curtain light strings 12 are gravitationally assisted by decorative termination devices 20 securely coupled an end of a corresponding one of light strings 12. Such gravitational assistance causes light strings 12 to hang in a substantially plumb fashion with respect to a level floor surface. Light strings 12 hang in such a plumb fashion because decorative termination devices 20 have a mass that is large with respect to a measure of the degree to which light strings 12 resist hanging in a plumb manner. For example, a sufficient ratio of the mass of decorative termination devices 20 either to the mass of one of a single lighting element 14 or to the mass of a single light string 12 can ensure that light string 12 hangs in a plumb fashion. For example, in some embodiments, a ratio of the mass of decorative termination device 20 either to the mass of lighting element 14 or to the mass of light string 12 can be equal to or greater than 1:2, 1:1, or 2:1, for example. The greater such ratios are, the more effective will be the decorative termination devices 20 in ensuring that light strings 12 hang in a substantially plumb fashion.

Figure 2A:
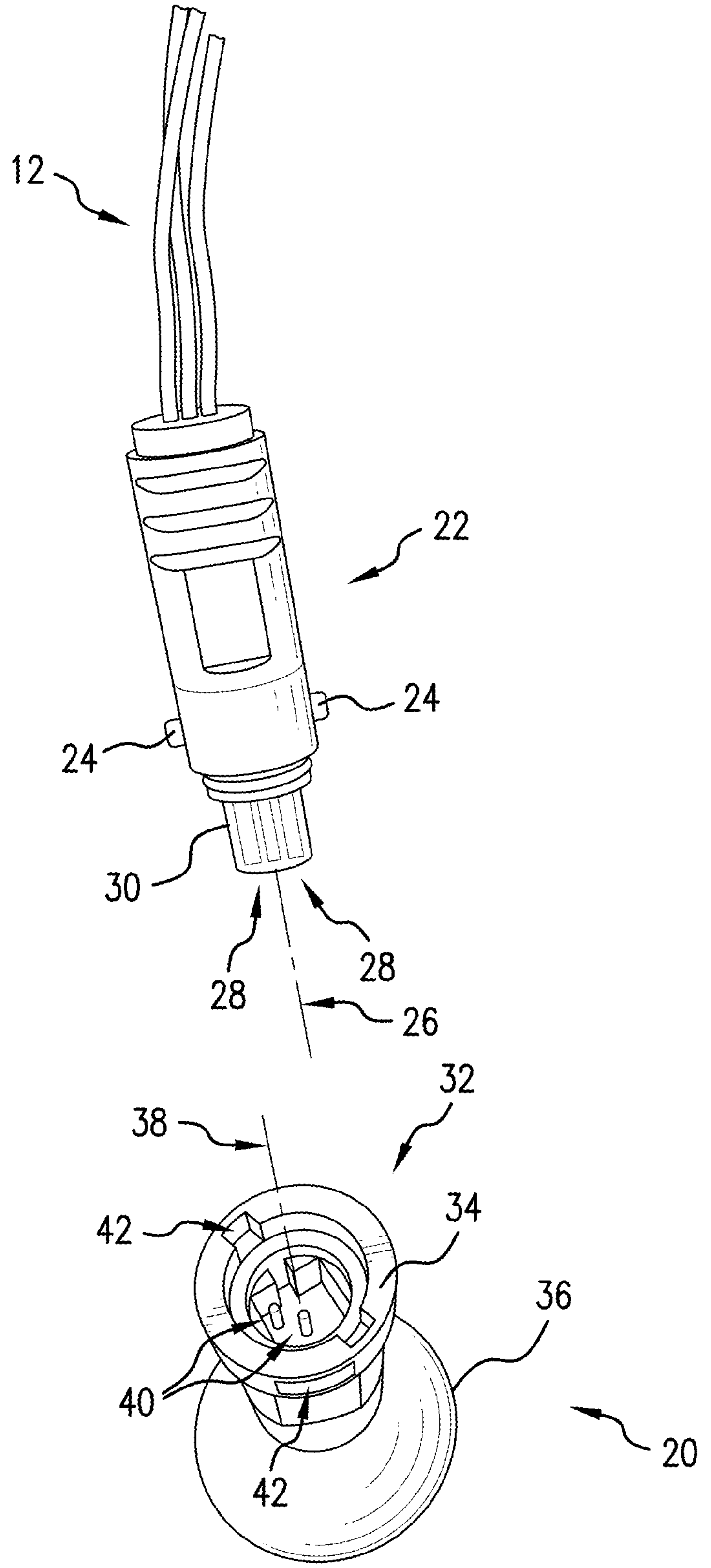
FIGS. 2A and 2B are a perspective view and a cross-sectional view, respectively, of a decorative termination device configured to securely couple to an electrical connector of a light string.
Figure 2B:
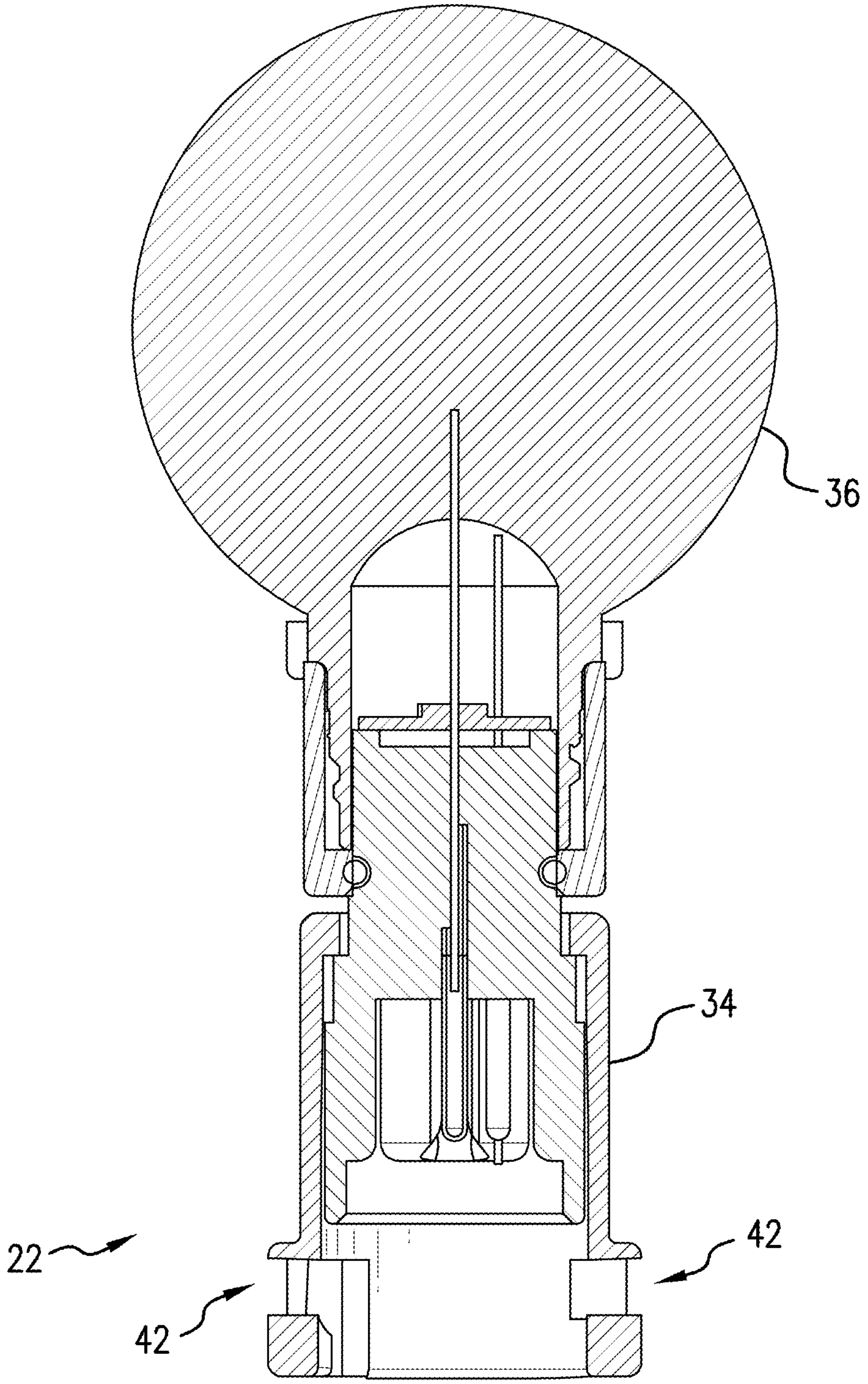

FIGS. 2A and 2B are a perspective view and a cross-sectional view, respectively, of a decorative termination device configured to securely couple to an electrical connector of a light string. In FIGS. 2A and 2B, light string 12 has electrical connector 22 that terminates the light string. Electrical connector 22 can be used for various purposes. For example, various lengths of decorative light strings can be used for decorating various venues. To accommodate such various venues, light string 12 terminates in electrical connector 22, which can connect to an additional light string(s), thereby lengthening the decorative lighting display created by light string 12 coupled with the additional light string(s). In such lighting displays, decorative termination device 20 can be coupled to electrical connector 22 of the last of the connected lights string(s). For venues in which light string 12 has an appropriate length, electrical connector 22 of light string 12 can connect to decorative termination device 20, which facilitates light string 12 to hang in a plumb fashion.

Regardless of whether electrical connector 22 of light string 12 is coupled to an additional light string(s) or to decorative termination device 20, electrical connector 22 is configured to provide some sort or retention mechanism so as to retain whatever is connected thereto. Various types of retention mechanisms can be used for retaining whatever is connected to electrical connector 22. For example, in the embodiment depicted in FIGS. 2A and 2B, electrical connector 22 has securing tabs 24 configured to secure to a complementary electrical connector. Securing tabs 24 project radially from a substantially cylindrical exterior surface of electrical connector 22 and project substantially perpendicular to longitudinal axis 26 of electrical connector 22. In the embodiment depicted in FIGS. 2A and 2B, electrical connector 22 of light string 12 is a female electrical connector with electrical contacts 28 within connection base 30 which longitudinally projects from an end of electrical connector 22. Connection base 30 can be keyed so as to facilitate proper rotational orientation of electrical contacts 28 with complimentary electrical contacts 40 of decorative termination device 20. Electrical connector 22 is configured to receive and conductively couple electrical contacts 28 to complementary electrical contacts 40 of electrical connector 32 of decorative termination device 20, which is complementary to electrical connector 22 of light string 12.

Electrical connector 32 has rotatable collar 34 rotatably coupled with decorative lighting ornament 36 and rotatable about longitudinal axis 38 of a body of electrical connector 32 of decorative termination device 20. Decorative lighting ornament 36 has electrical contacts 40 configured to conductive couple to electrical contacts 28 of electrical connector 22 of light string 12, so as to receive operating power therefrom for a lighting element of decorative lighting ornament 36. Rotatable collar 34 has L-shaped channels 42 in a substantially cylindrical interior surface of rotatable collar 34. Each of L-shaped channels 42 has a first section directed substantially parallel to longitudinal axis 38 of decorative termination device 20 and extending to an end of rotatable collar 34 so as to be able to receive securing tabs 24 therein. Each of L-shaped channels 42 also has a second section that is azimuthally aligned over an annular portion of the substantially cylindrical interior surface of rotatable collar 34.

To secure decorative termination device 20 to light string 12, longitudinal axis 38 of decorative termination device 20 is aligned with longitudinal axis 26 of light string 12 so as to be collinear with one another. Then, rotatable collar 34 of electrical connector 32 is rotated so that the first section of L-shaped channels 42 are aligned opposite securing tabs 24. Then, decorative termination device 20 is longitudinally translated in the direction of longitudinal axis 38 so that securing tabs 24 are received within first section of L-shaped channels 42. In some embodiments, decorative lighting ornament 36 may have to be rotated so that a reception cavity of electrical connector 32 is rotationally aligned with connection base 30 of electrical connector 22. In some embodiments, the reception cavity of electrical connector 32 is complementary to a keyed connection base 30. When securing tabs 24 are fully received within the first section of L-shaped channels 42, then rotatable collar 34 is rotated so as to be rotationally aligned with connection base 30 thereby rotatably translating the second section of L-shaped channels 42 about securing tabs 24, thereby receiving and capturing securing tabs 24 therein. In some embodiments, the reception cavity of electrical connector 32 is complementary to a keyed connection base 30 so that connection base 30 can be fully inserted within the reception cavity only if rotationally oriented properly. When rotated so as to capture securing tabs 24 within the second sections of L-shaped channels 42, decorative termination device 20 cannot be longitudinally translated away from light string 12. In some embodiments, a detent secures securing tabs 24 within L-shaped channels 42 of rotatable collar 34.

Figure 3:
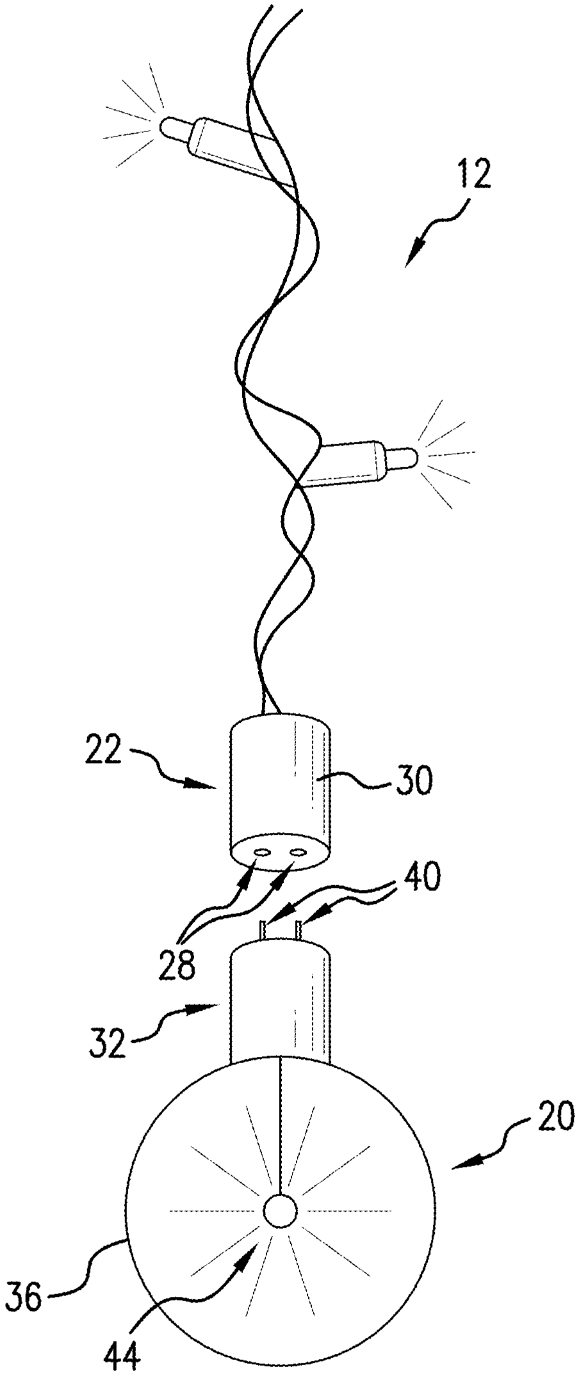
FIG. 3 is a perspective view of another embodiment of a decorative termination device configured to securely couple to an electrical connector of a light string.

FIG. 3 is a perspective view of another embodiment of a curtain termination device configured to securely couple to an electrical connector of a light string. In FIG. 3, light string 12 has electrical connector 22 that terminates the light string. Electrical connector 22 should provide some sort or retention mechanism so as to retain whatever is connected thereto. In the embodiment depicted in FIG. 3, electrical connector 22 securely couples to decorative termination device 20 using a tension connection between electrical contacts 28 of light string 12 and electrical contacts 40 of decorative termination device 20. For example, electrical contacts 28 can be configured to pinch electrical contacts 40 so as to retain electrical contacts 40 therewithin. In the embodiment depicted in FIG. 3, electrical connector 22 of light string 12 is a female electrical connector with electrical contacts 28 within connection base 30. Connection base 30 can be keyed so as to facilitate proper rotational orientation of electrical connector 22 with a complimentary electrical connector that can be connected thereto. For example, keying can be performed by the location and size of electrical contacts 28. Electrical connector 22 is configured to receive and conductively couple electrical contacts 28 to complementary electrical contacts of an electrical connector that is complementary to electrical connector 22 of light string 12.

Decorative termination device 20 has electrical connector 32 that is complementary to electrical connector 22 of light string 12. Electrical connector 32 is fixedly coupled with decorative lighting ornament 36. Decorative lighting ornament 36 has electrical contacts 40 configured conductive couple to electrical contacts 28 of electrical connector 22 of light string 12 to receive operating power therefrom for a lighting element of decorative lighting ornament 36 that has lighting element 44 therewithin. Such lighting element 44 is conductively coupled electrical contacts 28. To secure decorative termination device 20 to light string 12, longitudinal axis 38 of decorative termination device 20 is aligned with longitudinal axis 26 of light string 12 so as to be collinear with one another. Then, decorative termination device 20 is longitudinally translated in the direction of longitudinal axis 38 so that electrical connector 32 is rotationally aligned with connection base 30 of electrical connector 22. When electrical contacts 40 are fully inserted into and contacting electrical contacts 28, decorative termination device 20 resists longitudinally translation away from light string 12.

Figure 4:
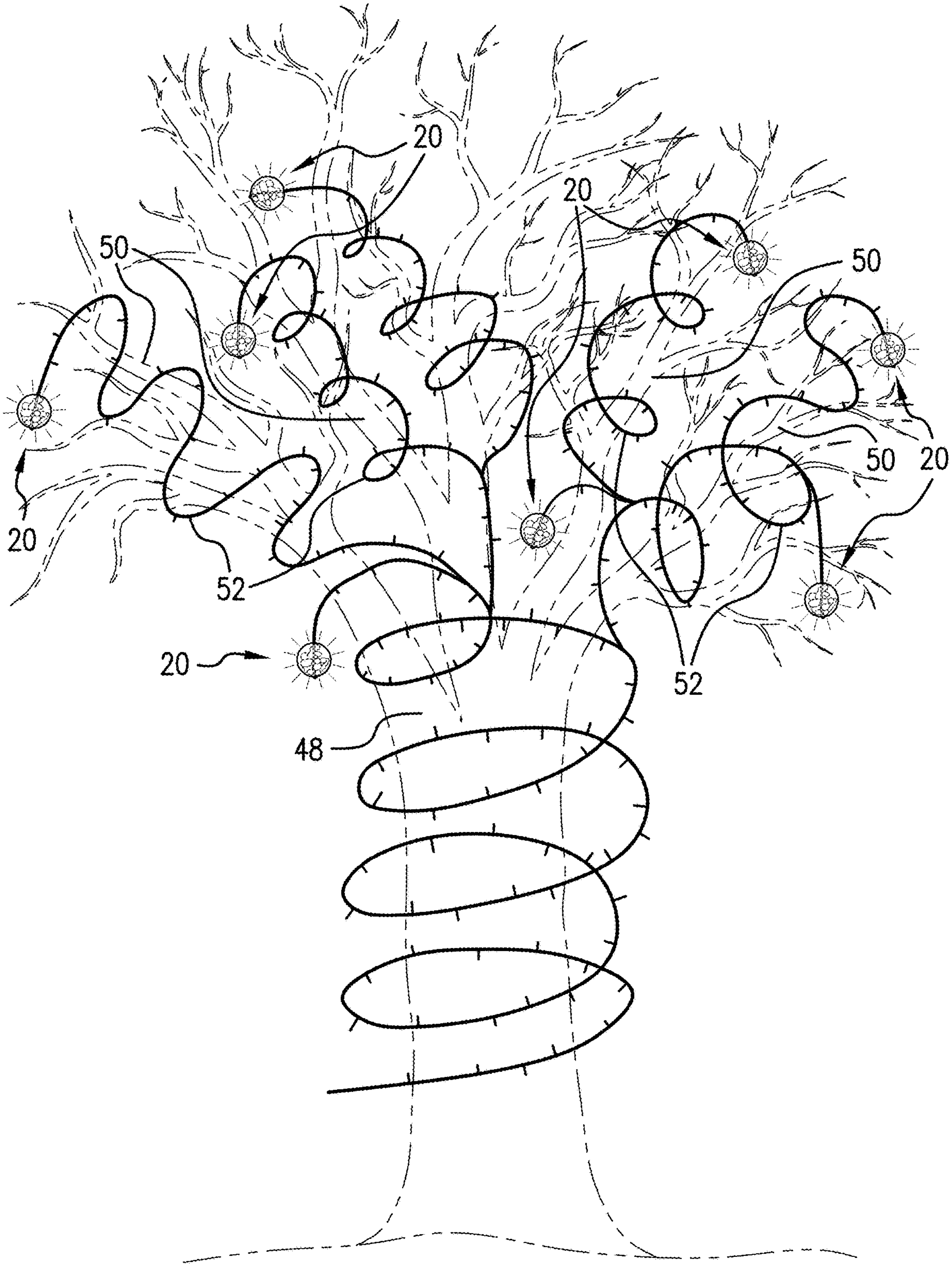
FIG. 4 is a perspective view of another embodiment of a decorative lighting display that includes a plurality of decorative termination devices.

FIG. 4 is a perspective view of another embodiment of a decorative lighting display that includes a plurality of curtain termination devices. In FIG. 4, decorative lighting display 46 adorns tree 48. To decorate each of tree branches 50, decorative lighting display 46 has various lighting display branches 52, each of which is terminated in decorative termination device 20. As can be seen, decorative termination devices can be used in various ways to provide termination to ends of lighting displays of various configurations.

Figure 5:
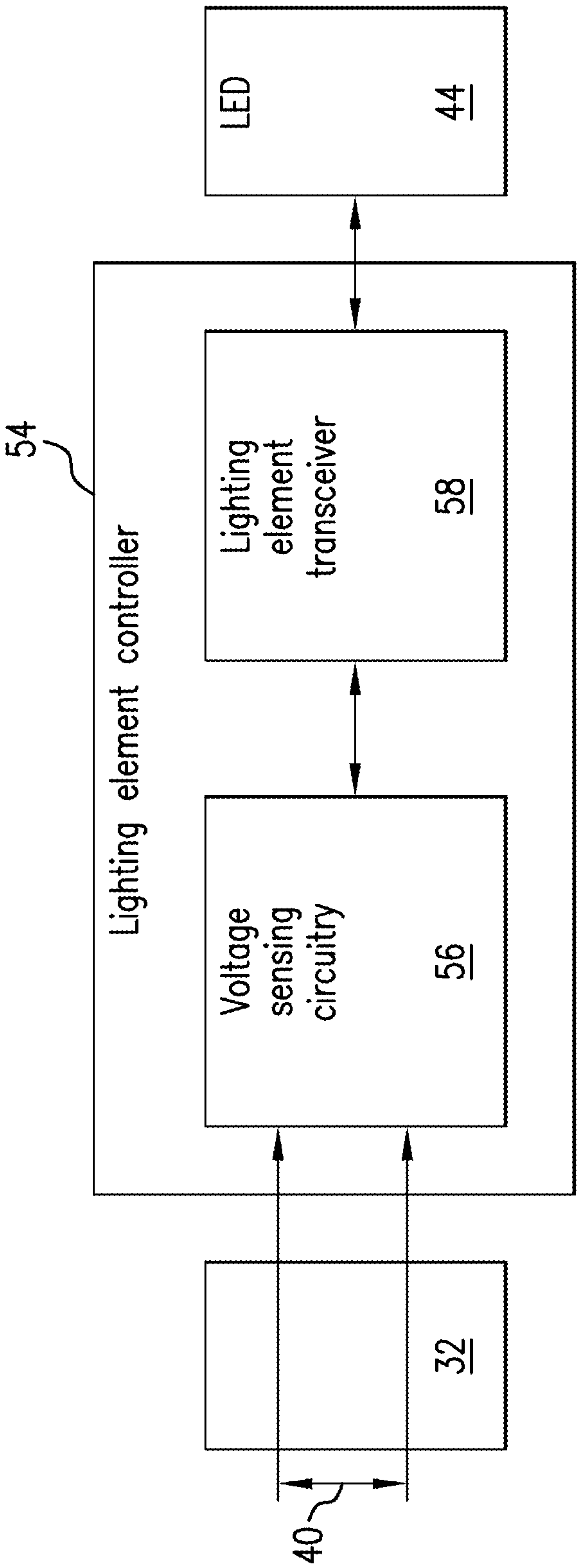
FIG. 5 is a block diagram of a lighting element controller for a decorative termination device.

FIG. 5 is a block diagram of a lighting element controller for a decorative termination device. In FIG. 5, lighting element controller 54 includes voltage sensing circuitry 56 and lighting element transceiver 58. Voltage sensing circuitry is conductively coupled to electrical contacts 40. Voltage sensing circuitry 56 is configured to sense an operating voltage of the operating power received by electrical contacts 40. Voltage sensing circuitry 56 then compares the operating voltage with one or more predetermined thresholds. Voltage sensing circuitry 56 generates a voltage-indicator signal indicative of the relative magnitude of the operating voltage with respect to the one or more predetermined thresholds. Voltage sensing circuitry 56 transmits the voltage-indicator signal generated thereby to lighting element transceiver 58. Lighting element transceiver 58 generates a color-control signal configured to control the color of light emitted by lighting element 44. The color-control signal generated by lighting element transceiver 58 is based on the voltage-indicator signal received from voltage sensing circuitry 56. Lighting element transceiver 58 transmits the color-control signal to lighting element 44. Lighting element 44 then emits light of a color corresponding to the color-control signal received.

As light strings are added to a decorative lighting display, the operating voltage can begin to drop in response to the increasing load that draws operating power. By emitting light of a color indicative of the relative magnitude of the operating voltage, decorative termination device 20 can provide feedback to a user regarding whether the operating voltage at the location where decorative termination device is connected. For example, for a decorative lighting system configured for 24.5 Volt DC operation, the color emitted by decorative termination device can be: i) warm white if the operating voltage exceeds 22 VDC; ii) green if the operating voltage is between 21 VDC and 22 VDC; and iii) red if the operating voltage does not exceed 21 VDC. To accomplish such an operation, voltage sensing circuitry need only compare the operating voltage sensed with predetermined thresholds voltages of 21 VDC and 22 VDC. In other embodiments, both number and levels of the predetermined thresholds can be used. IN still other embodiments, AC voltage thresholds can be used for decorative lighting displays configured to receive AC operating power.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A decorative termination device for a curtain light string having a plurality of lighting elements, the decorative termination device comprising:

a locking connector configured to physically couple with and secure to a terminal electrical connector located at an end of the curtain light string, the terminal connector configured to provide operating power to another curtain light string if connected thereto, wherein, when secured to the terminal electrical connector of the curtain light string, a locking mechanism prevents decoupling of the locking connector from the terminal electrical connector in response to a tensile force acting upon the curtain light string; and a decorative ornament connected to the locking connector, the decorative ornament having a mass equal to or greater than a mass of a single one of the plurality of lighting elements of the curtain light string, thereby causing the curtain light string to hang in a plumb fashion.

2. The decorative termination device of claim 1, wherein the terminal electrical connector of the curtain light string is configured to couple to a complementary connector of another curtain light string.

3. The decorative termination device of claim 2, wherein the locking connector has electrical contacts configured to conductively couple to electrical contacts of the terminal electrical connector of the curtain light string when physically coupled thereto, the decorative termination device further comprising:

a lighting element conductively coupled to the electrical contacts of the locking connector so as to draw operating power therefrom.

4. The decorative termination device of claim 3, further comprising:

voltage sensing circuitry configured to sense an operating voltage of the operating power drawn from the electrical contacts of the terminal electrical connector of the curtain light string, wherein the lighting element is configured to emit light of a first color in response to the operating voltage exceeding a predetermined threshold, and to emit light of a second color in response to the operating voltage not exceeding the predetermined threshold.

5. The decorative termination device of claim 3, wherein electrical contacts of the locking connector are configured to conductively couple to complementary electrical contacts of the terminal electrical connector of the curtain light string in response to the locking connector being longitudinally translated along a colinear longitudinal axes of the locking connector and the terminal electrical connector of the curtain light string so as to engage one another.

6. The decorative termination device of claim 5, wherein the locking connector has a body and a rotatable collar, the electrical contacts of the locking connector are secured within the body of the locking connector, and the rotatable collar is configured to rotate about the longitudinal axis of the locking connector.

7. The decorative termination device of claim 6, wherein the rotatable collar longitudinally secures the body of the locking connector to the terminal electrical connector of the curtain light string.

8. The decorative termination device of claim 7, wherein the locking connector physically couples to the terminal electrical connector of the curtain light string via a two-step process, in which the body of the locking connector is translated along the longitudinal axis so as to engage the terminal electrical connector of the curtain light string and then the rotatable collar is rotated about the longitudinal axis to lock the longitudinally secure the body of the locking connector to the terminal electrical connector of the curtain light string.

9. The decorative termination device of claim 8, wherein the locking connector has a channel configured to receive a locking lug that projects from the terminal electrical connector of the curtain light string.

10. The decorative termination device of claim 9, wherein the channel is located on an interior surface of the locking connector.

11. The decorative termination device of claim 10, wherein the channel is L-shaped, a first leg of the L-shaped channel configured to longitudinally guide the locking connector about the locking lug projecting from the terminal electrical connector of the curtain light string, a second leg of the L-shaped channel configured to rotationally guide the locking connector about the locking lug while the locking connector is rotated about the longitudinal axis.

12. The decorative termination device of claim 9, wherein the channel has a detent feature, in which the locking lug is secured when residing therein.

13. The decorative termination device of claim 1, wherein a ratio of the mass of the decorative ornament to a single lighting element of the curtain light string is at least 10:1.

14. The decorative termination device of claim 1, wherein a ratio of the mass of the decorative ornament of a mass of the decorative termination device is greater than 80%.

15. The decorative termination device of claim 1, wherein a length of the decorative termination device from the locking connector to an end of the decorative ornament is less than 10 cm.

16. The decorative termination device of claim 1, wherein the decorative ornament comprises glass.

17. The decorative termination device of claim 1, wherein the decorative ornament comprises plastic.

18. The decorative termination device of claim 1, wherein the curtain light string includes one or more light strings.

19. The decorative termination device of claim 1, wherein the curtain light string includes a curtain light string.

20. A method of terminating a curtain light string having a plurality of lighting elements, the method comprising:

providing a decorative termination device having a locking connector coupled thereto;

physically securing the locking connector of the decorative termination device to a terminal electrical connector located at an end of the curtain light string, the terminal connector configured to provide operating power to another curtain light string if connected thereto, wherein when secured to the terminal electrical connector of the curtain light string, a locking mechanism prevents decoupling of the locking connector from the terminal lighting element in response to a tensile force acting upon the decorative termination device; and providing the tensile force to the curtain light string via the decorative termination device.

21. The method of claim 20, further comprising:

receiving operation power from the terminal electrical connector, via the locking connector of the decorative termination device so as to illuminate a lighting element of the decorative termination device.

22. The method of claim 21, further comprising:

sensing, via voltage sensing circuitry, sense an operating voltage of the operating power received from the terminal electrical connector, emitting light of a first color in response to the operating voltage exceeding a predetermined threshold; and emitting light of a second color in response to the operating voltage not exceeding the predetermined threshold.

* * * * *